(12) United States Patent
Millendorf et al.

(10) Patent No.: US 9,160,525 B2
(45) Date of Patent: Oct. 13, 2015

(54) APPARATUS AND METHOD FOR KEY UPDATE FOR USE IN A BLOCK CIPHER ALGORITHM

(71) Applicant: QUALCOMM Incorporated, San Diego, CA (US)

(72) Inventors: Steven M. Millendorf, San Diego, CA (US); Cameron A. McDonald, Queenscliff (AU)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 13/946,797

(22) Filed: Jul. 19, 2013

(65) Prior Publication Data

US 2015/0023497 A1 Jan. 22, 2015

(51) Int. Cl.
*H04L 9/00* (2006.01)
*H04L 9/06* (2006.01)

(52) U.S. Cl.
CPC .............. *H04L 9/0637* (2013.01); *H04L 9/003* (2013.01); *H04L 9/0631* (2013.01); *H04L 2209/24* (2013.01)

(58) Field of Classification Search
None
See application file for complete search history.

(56) References Cited

U.S. PATENT DOCUMENTS

| 6,259,789 | B1 | 7/2001 | Paone |
| 8,041,032 | B2 | 10/2011 | Katoozi et al. |
| 8,386,800 | B2 | 2/2013 | Kocher et al. |
| 2002/0191784 | A1* | 12/2002 | Yup et al. ................ 380/37 |
| 2007/0053516 | A1* | 3/2007 | Katoozi et al. .......... 380/259 |
| 2009/0086976 | A1* | 4/2009 | Scian ...................... 380/277 |
| 2010/0061551 | A1 | 3/2010 | Jung et al. |
| 2010/0074440 | A1 | 3/2010 | Lee et al. |
| 2012/0321079 | A1* | 12/2012 | Badole .................... 380/45 |

FOREIGN PATENT DOCUMENTS

EP 2197144 A1 6/2010

OTHER PUBLICATIONS

International Search Report and Written Opinion for PCT/US2014/045609—ISA/EPO—Mar. 5, 2015.
"Specification for the Advanced Encryption Standard (AES)", Federal Informaion Processing Standards Publication, XX, XX, No. 197, Nov. 26, 2001, Page complete, XP002456927.

* cited by examiner

*Primary Examiner* — Kaveh Abrishamkar
(74) *Attorney, Agent, or Firm* — Loza & Loza, LLP

(57) ABSTRACT

A method herein is for encryption key update in a station. In the method, a first data block is encrypted using a first plurality of round keys over a first plurality of rounds to generate a first encrypted data block, wherein the first plurality of round keys are generated based on an initial block key. A round key of the first plurality of round keys is retained for use as a basis for a first derived block key. A second data block is encrypted using a second plurality of round keys over a second plurality of rounds to generate a second encrypted data block, wherein the second plurality of round keys are generated based on the first derived block key. A round key of the second plurality of round keys may be retained for use as a basis for a second derived block key.

78 Claims, 5 Drawing Sheets

FIG. 3     Key Update – Encryption

Key Update – Decryption

APPARATUS AND METHOD FOR KEY UPDATE FOR USE IN A BLOCK CIPHER ALGORITHM

BACKGROUND

1. Field

The present invention relates generally to a technique for updating an encryption/decryption key used in a block cipher algorithm.

2. Background

Differential power analysis (DPA) attacks are becoming more prevalent because data collection and analysis is becoming relatively cheap to perform with modern equipment. A DPA attack is a statistical side-channel attack that deduces a secret key. Techniques for countering a DPA attack may involve power supply filtering, random noise insertion, key "masking", or key rolling techniques. Some of such techniques may be computationally intensive or otherwise may prove to be impractical.

A technique disclosed in U.S. Pat. No. 8,386,800 is based on a ciphertext hash chaining process using a hash function to provide a rolling key for defeating a DPA attack. However, the hash function may be costly in processing time, system resources, and/or device circuitry.

There is therefore a need for a key update technique for use in a block cipher algorithm to thwart an attack such as a DPA attack.

SUMMARY

An aspect of the present invention may reside in a method for encryption key update in a station. In the method, a first data block is encrypted using a first plurality of round keys over a first plurality of rounds to generate a first encrypted data block, wherein the first plurality of round keys are generated based on an initial block key. A round key of the first plurality of round keys is retained for use as a basis for a first derived block key. A second data block is encrypted using a second plurality of round keys over a second plurality of rounds to generate a second encrypted data block, wherein the second plurality of round keys are generated based on the first derived block key.

In more detailed aspects of the invention, a round key of the second plurality of round keys may be retained for use as a basis for a second derived block key. The first and second encrypted data blocks may be generated using the AES (Advanced Encryption Standard) algorithm. The first derived block key may be a last round key of the first plurality of round keys, and the second derived block key may be a last round key of the second plurality of round keys. Alternatively, the first derived block key may be based on an additional round key generated by further processing a last round key of the first plurality of round keys by at least one additional round, and the second derived block key may be based on an additional round key generated by further processing a last round key of the second plurality of round keys by at least one additional round.

In other more detailed aspects of the invention, the station may be a hardware station, and the encrypting and retaining may be performed by the hardware station. The first data block, second data block, the first encrypted data block, and the second encrypted data block, each may comprise 128 bits, and the initial block key, first derived block key, the second derived block key, the round keys of the first plurality of round keys, and the round keys of the second plurality of round keys, each may comprise 192 bits. Alternatively, the first data block, second data block, the first encrypted data block, and the second encrypted data block, each may comprise 128 bits, and the initial block key, first derived block key, the second derived block key, the round keys of the first plurality of round keys, and the round keys of the second plurality of round keys, each may comprise 256 bits.

Another aspect of the invention may reside in a station, comprising: means for encrypting a first data block using a first plurality of round keys over a first plurality of rounds to generate a first encrypted data block, wherein the first plurality of round keys are generated based on an initial block key; means for retaining a round key of the first plurality of round keys for use as a basis for a first derived block key; and means for encrypting a second data block using a second plurality of round keys over a second plurality of rounds to generate a second encrypted data block, wherein the second plurality of round keys are generated based on the first derived block key.

Another aspect of the invention may reside in a station, comprising: a processor configured to: encrypt a first data block using a first plurality of round keys over a first plurality of rounds to generate a first encrypted data block, wherein the first plurality of round keys are generated based on an initial block key; retain a round key of the first plurality of round keys for use as a basis for a first derived block key; and encrypt a second data block using a second plurality of round keys over a second plurality of rounds to generate a second encrypted data block, wherein the second plurality of round keys are generated based on the first derived block key.

Another aspect of the invention may reside in a computer program product, comprising: computer-readable medium, comprising: code for causing a computer to encrypt a first data block using a first plurality of round keys over a first plurality of rounds to generate a first encrypted data block, wherein the first plurality of round keys are generated based on an initial block key; code for causing a computer to retain a round key of the first plurality of round keys for use as a basis for a first derived block key; and code for causing a computer to encrypt a second data block using a second plurality of round keys over a second plurality of rounds to generate a second encrypted data block, wherein the second plurality of round keys are generated based on the first derived block key.

In addition, an aspect of the present invention may reside in a method for key update in a station. In the method, an initial block key is processed to generate a first plurality of round keys. A round key of the first plurality of round keys is retained for use as a basis for a first derived key. A first encrypted data block is decrypted using the first plurality of round keys over a first plurality of rounds to generate a first decrypted data block while processing the first derived key to generate a second plurality of round keys. A round key of the second plurality of round keys is retained for use as a basis for a second derived key. A second encrypted data block is decrypted using the second plurality of round keys over a first plurality of rounds to generate a second decrypted data block while processing the second derived key to generate a third plurality of round keys.

In more detailed aspects of the invention, a round key of the second plurality of round keys may be retained for use as a basis for a third derived key. The first encrypted data block, the second encrypted data block, the first decrypted data block, and the second decrypted data block, each may comprise 128 bits, and the initial block key, the first derived block key, the second derived block key, the third derived block key, the round keys of the first plurality of round keys, and the round keys of the second plurality of round keys, each may comprise 192 bits. Alternatively, the first encrypted data block, the second encrypted data block, the first decrypted data block, and the second decrypted data block, each may comprise 128 bits, and the initial block key, the first derived block key, the second derived block key, the third derived block key, the round keys of the first plurality of round keys, and the round keys of the second plurality of round keys, each may comprise 256 bits.

Another aspect of the invention may reside in a station, comprising: means for processing an initial block key to generate a first plurality of round keys; means for retaining a round key of the first plurality of round keys for use as a basis for a first derived key; means for decrypting a first encrypted data block using the first plurality of round keys over a first plurality of rounds to generate a first decrypted data block while processing the first derived key to generate a second plurality of round keys; means for retaining a round key of the second plurality of round keys for use as a basis for a second derived key; and means for decrypting a second encrypted data block using the second plurality of round keys over a first plurality of rounds to generate a second decrypted data block while processing the second derived key to generate a third plurality of round keys.

Another aspect of the invention may reside in a station, comprising: a processor configured to: process an initial block key to generate a first plurality of round keys; retain a round key of the first plurality of round keys for use as a basis for a first derived key; decrypt a first encrypted data block using the first plurality of round keys over a first plurality of rounds to generate a first decrypted data block while processing the first derived key to generate a second plurality of round keys; retain a round key of the second plurality of round keys for use as a basis for a second derived key; and decrypt a second encrypted data block using the second plurality of round keys over a first plurality of rounds to generate a second decrypted data block while processing the second derived key to generate a third plurality of round keys.

Another aspect of the invention may reside in a computer program product, comprising: computer-readable medium, comprising: code for causing a computer to process an initial block key to generate a first plurality of round keys; code for causing a computer to retain a round key of the first plurality of round keys for use as a basis for a first derived key; code for causing a computer to decrypt a first encrypted data block using the first plurality of round keys over a first plurality of rounds to generate a first decrypted data block while processing the first derived key to generate a second plurality of round keys; code for causing a computer to retain a round key of the second plurality of round keys for use as a basis for a second derived key; and code for causing a computer to decrypt a second encrypted data block using the second plurality of round keys over a first plurality of rounds to generate a second decrypted data block while processing the second derived key to generate a third plurality of round keys.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
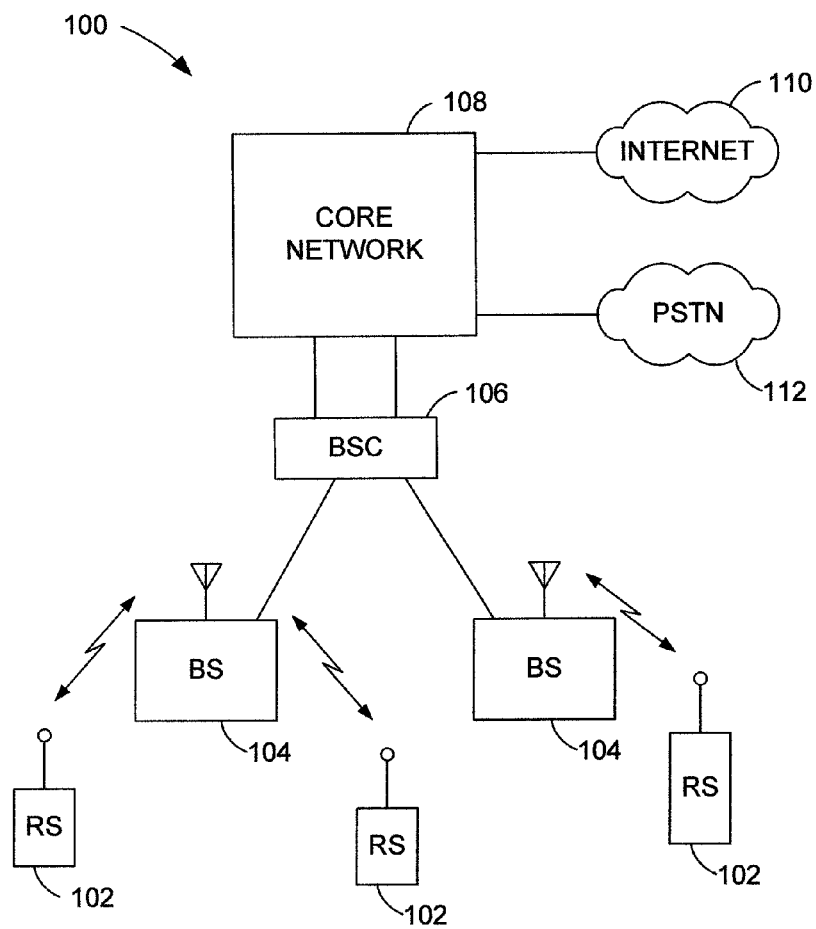
FIG. 1 is a block diagram of an example of a wireless communication system.
Figure 2:
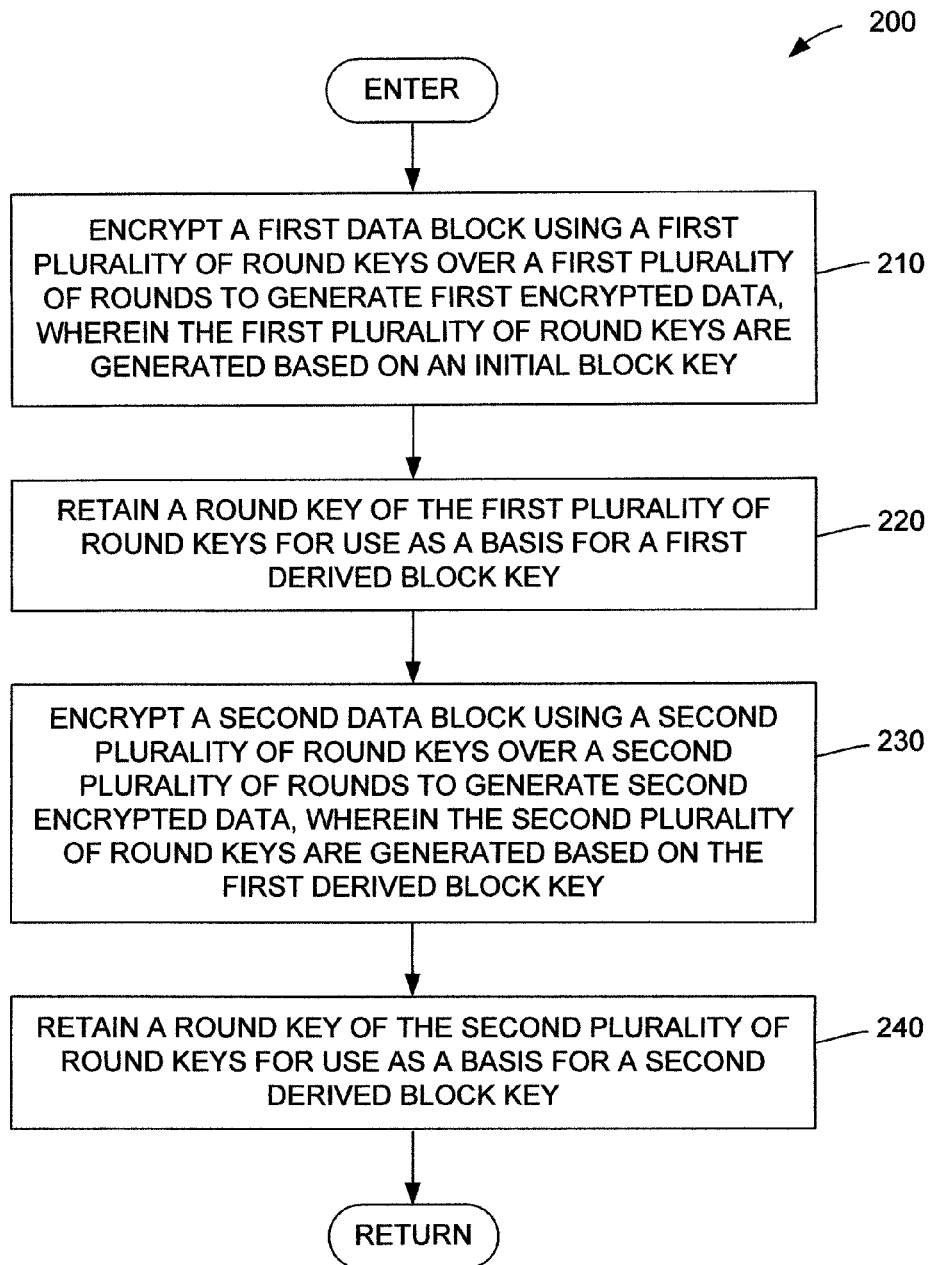
FIG. 2 is a flow diagram of a method for encryption key update in a station, according to the present invention.
Figure 3:
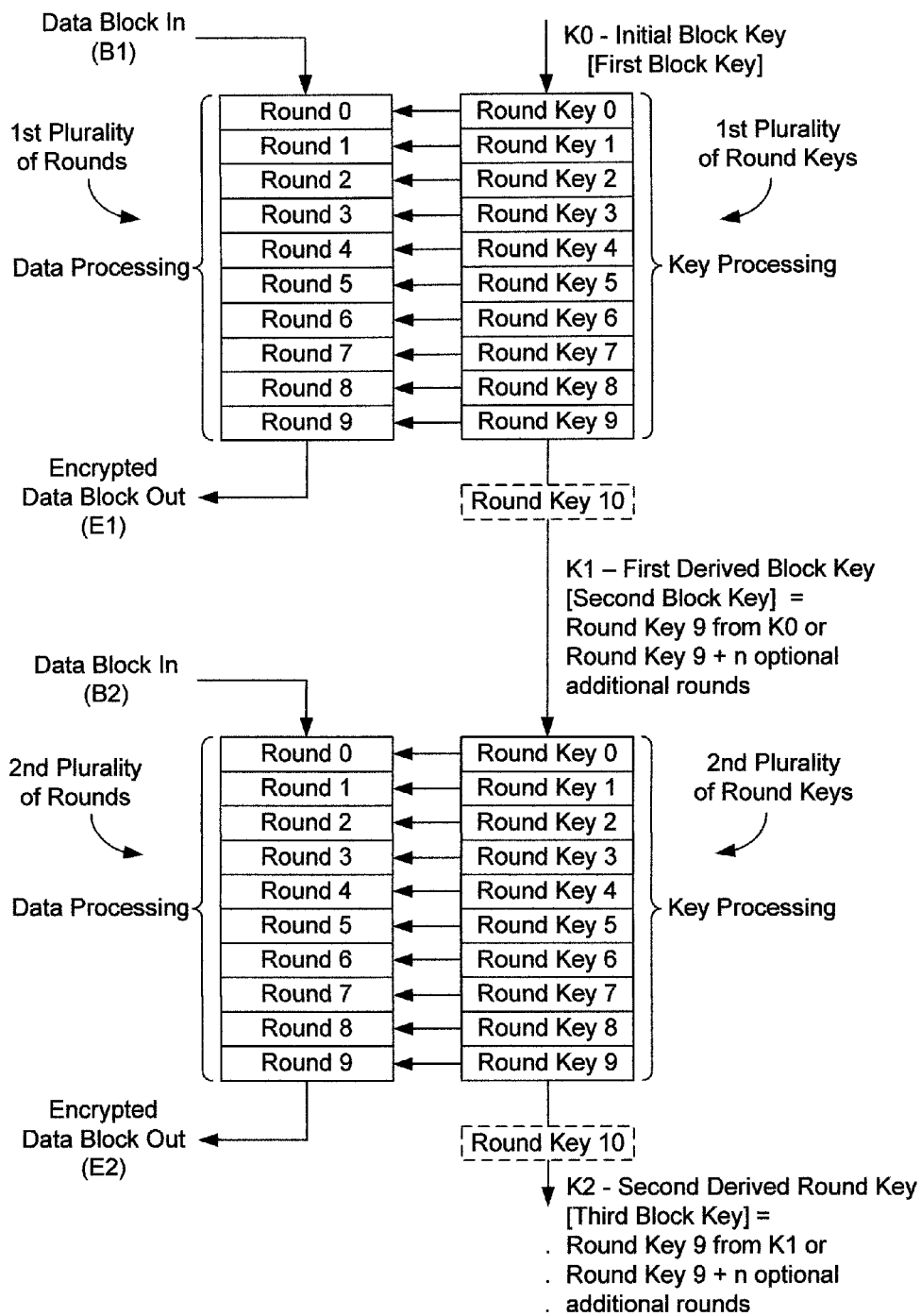
FIG. 3 is a schematic diagram related to a method for updating a key for encryption use in a block cipher algorithm.

With reference to FIGS. 1, 2 and 3, an aspect of the present invention may reside in a method 200 for encryption key update in a station 102. In the method, a first data block B1 is encrypted using a first plurality of round keys over a first plurality of rounds to generate a first encrypted data block E1, wherein the first plurality of round keys are generated based on an initial block key K0 (step 210). A round key of the first plurality of round keys is retained for use as a basis for a first derived block key K1 (step 220). A second data block B2 is encrypted using a second plurality of round keys over a second plurality of rounds to generate a second encrypted data block E2, wherein the second plurality of round keys are generated based on the first derived block key K1 (step 230).

In more detailed aspects of the invention, a round key of the second plurality of round keys is retained for use as a basis for a second derived block key K2 (step 240). The first and second encrypted data blocks, E1 and E2, may be generated using the AES (Advanced Encryption Standard) algorithm. The first derived block key K1 may be a last round key of the first plurality of round keys, e.g., $RK9_1$, and the second derived block key K2 may be a last round key of the second plurality of round keys, e.g., $RK9_2$. Alternatively, the first derived block key K1 may be based on an additional round key generated by further processing a last round key of the first plurality of round keys by at least one additional round $RK9+n_1$, and the second derived block key K2 may be based on an additional round key generated by further processing a last round key of the second plurality of round keys by at least one additional round, e.g., $RK9+n_2$.

The invention may relate to a technique for updating an encryption/decryption key used in a block cipher algorithm, such as the AES algorithm. In the context of the AES algorithm, for each data block, the final round key (or a derivative thereof) of the key scheduling may be used as the first round key for the next block key. Thus, instead of reusing the same block key over and over, the block key for the next data block may be the last round key for the previous data block (or a round key from one or more additional rounds). As a result, the same key material is essentially never used twice, and the statistical analysis required for a successful DPA (differential power analysis) attack is unable to be performed.

The data input and output for the AES algorithm each consist of sequences of 128 bits (digits with values of 0 or 1). These sequences are generally referred to as blocks, and the number of bits they are referred to as their length. The cipher key (block key) for the AES algorithm is defined as a sequence of 128, 192 or 256 bits. The round keys in the AES algorithm have the same length as the cipher key. Thus, the use of a round key as the basis for the next cipher/block key has substantial advantages over using a hash of the standard encrypted data output resulting from an entropy redistribution operation being implemented with AES. A hash function would require additional system resources (e.g., processing time and/or circuitry) to calculate the new cipher/block key.

The present invention is efficient in that the cipher/block keys for subsequent blocks are byproducts of existing AES operation, and which keys are not based on a function performed on an encrypted output resulting from a standard AES operation. No additional functions are required to be performed to develop the subsequent cipher/block keys, and, when not using additional rounds, the subsequent cipher/block key derivation/processing may be performed concurrently with the block data processing without requiring additional processing hardware.

AES 128, 192, and 256-bit cipher keys use 10, 12, and 14 rounds, respectively. Although 10 rounds are shown in FIG. 3 (and FIG. 5), 12 or 14 rounds, or additional rounds as desired, would be implemented in accordance with the larger cipher key length. Thus, the number of rounds is not limited by the number shown in the drawings.

In other more detailed aspects of the invention, the station 102 may be a hardware station, and the encrypting and retaining may be performed by the hardware station. The first data block B1, second data block B2, the first encrypted data block E1, and the second encrypted data block E2, each may comprise 128 bits, and the initial block key K0, first derived block key K1, the second derived block key K2, the round keys of the first plurality of round keys, and the round keys of the second plurality of round keys, each may comprise 192 bits. Alternatively, the first data block B1, second data block B2, the first encrypted data block E1, and the second encrypted data block E2, each may comprise 128 bits, and the initial block key K0, first derived block key K1, the second derived block key K2, the round keys of the first plurality of round keys, and the round keys of the second plurality of round keys, each may comprise 256 bits.

Figure 6:
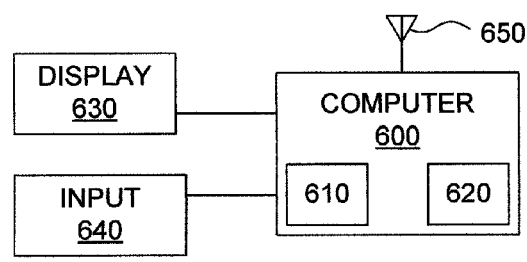
FIG. 6 is a block diagram of a computer including a processor and a memory.

With further reference to FIGS. 1 and 6, another aspect of the invention may reside in a station 102, comprising: means 610 for encrypting a first data block B1 using a first plurality of round keys over a first plurality of rounds to generate a first encrypted data block E1, wherein the first plurality of round keys are generated based on an initial block key K0; means 610 for retaining a round key of the first plurality of round keys for use as a basis for a first derived block key K1; and means 610 for encrypting a second data block B2 using a second plurality of round keys over a second plurality of rounds to generate a second encrypted data block E2, wherein the second plurality of round keys are generated based on the first derived block key K1.

Another aspect of the invention may reside in a station 102, comprising: a processor 610 configured to: encrypt a first data block B1 using a first plurality of round keys over a first plurality of rounds to generate a first encrypted data block E1, wherein the first plurality of round keys are generated based on an initial block key K0; retain a round key of the first plurality of round keys for use as a basis for a first derived block key K1; and encrypt a second data block B2 using a second plurality of round keys over a second plurality of rounds to generate a second encrypted data block E2, wherein the second plurality of round keys are generated based on the first derived block key K1.

Another aspect of the invention may reside in a computer program product, comprising: computer-readable medium 620, comprising: code for causing a computer 600 to encrypt a first data block B1 using a first plurality of round keys over a first plurality of rounds to generate a first encrypted data block E1, wherein the first plurality of round keys are generated based on an initial block key K0; code for causing a computer 600 to retain a round key of the first plurality of round keys for use as a basis for a first derived block key K1; and code for causing a computer 600 to encrypt a second data block B2 using a second plurality of round keys over a second plurality of rounds to generate a second encrypted data block E2, wherein the second plurality of round keys are generated based on the first derived block key K1.

Decryption operations generally operate by stepping forward in the key scheduling algorithm until the last round key is generated because there is a need to pre-compute the round keys and start with the last round key for the first round of data decryption. That last round key is stored, and then the algorithm is operated backwards while operating on the data. Subsequent data blocks start with the stored last round key to improve performance. With certain key rolling algorithms, such as one based on a hash function, this performance increase would not be possible because the last round key used for the second data block is not the same as the last round key used for the first data block. Pre-computing the last round key for each rolling block key may incur a significant performance hit.

However, with the present invention, this pre-computation issue is easily addressed in hardware by duplicating the key scheduling block and having it compute the final round key for the next data block simultaneously with operating on the current data block. The hardware implementation of this technique would have a relatively small area impact in terms of chip size/area.

Figure 4:
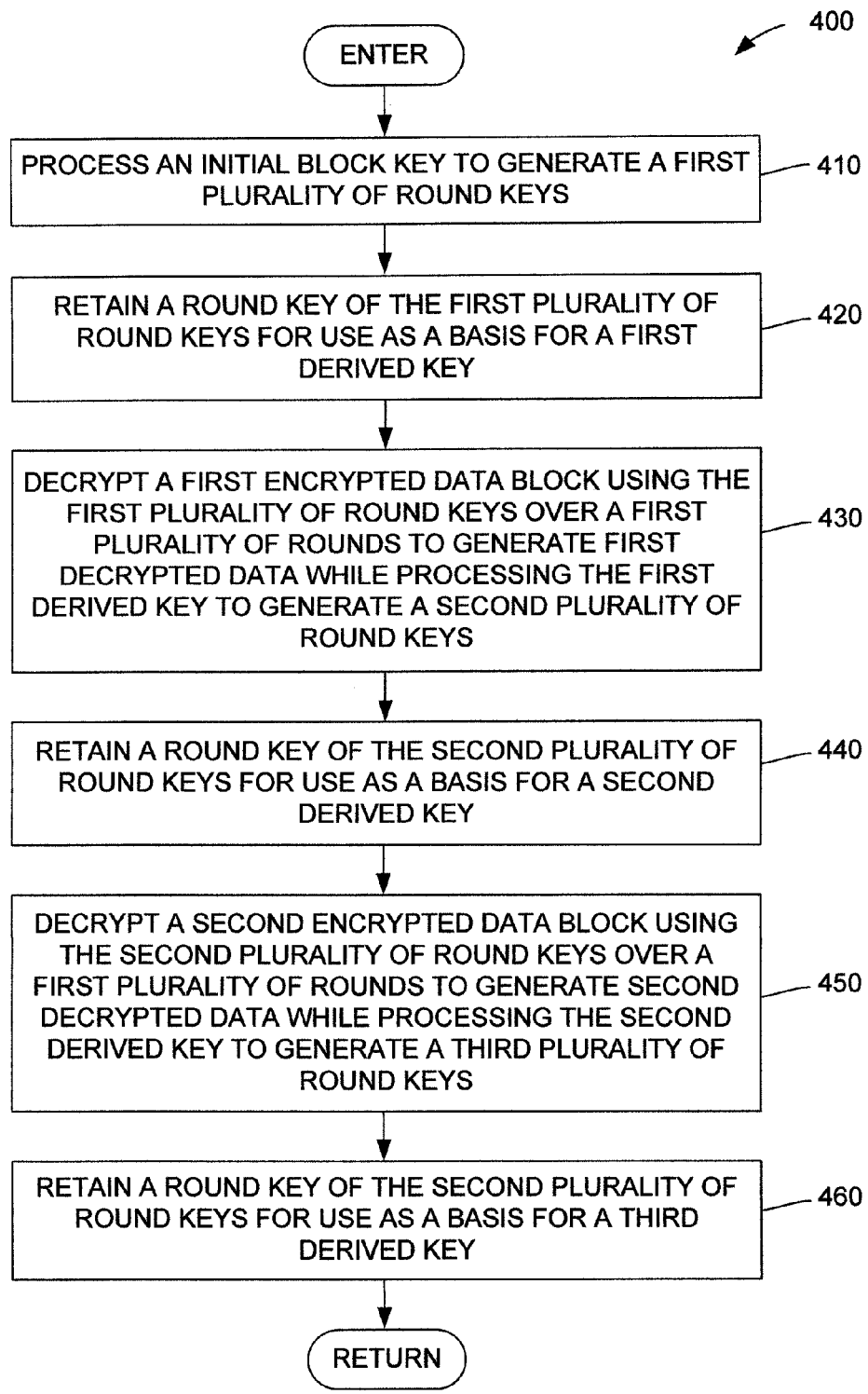
FIG. 4 is a flow diagram of a method for key update in a station, according to the present invention.
Figure 5:
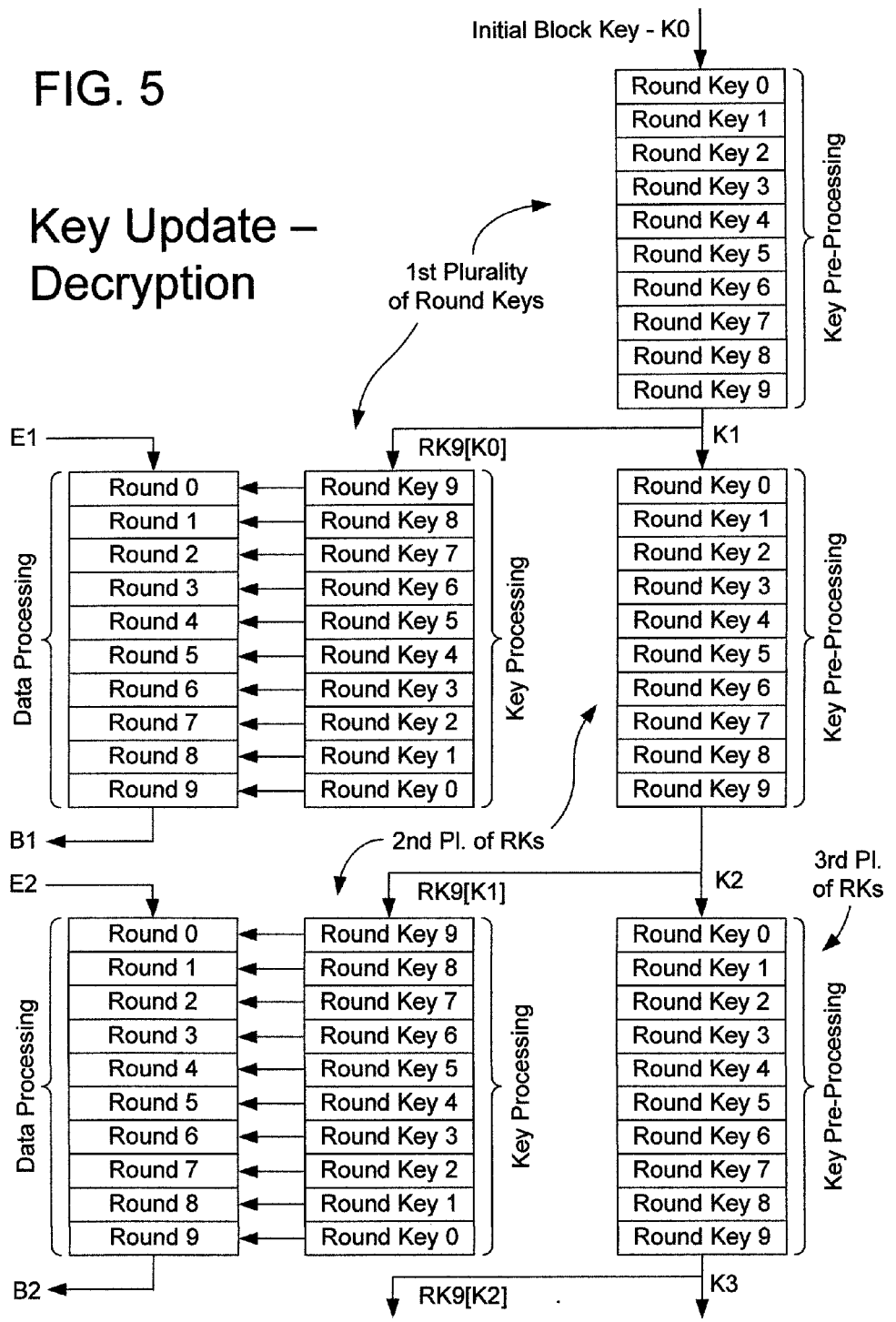
FIG. 5 is a schematic diagram of related to a method for updating a key for decryption use in a block cipher algorithm.

With reference to FIGS. 4 and 5, another aspect of the present invention may reside in a method 400 for key update in a station 102. In the method, an initial block key K0 is processed to generate a first plurality of round keys (step 410). A round key of the first plurality of round keys is retained for use as a basis for a first derived key K1 (step 420). A first encrypted data block E1 is decrypted using the first plurality of round keys over a first plurality of rounds to generate a first decrypted data block B1 while simultaneously processing the first derived key K1 to generate a second plurality of round keys (step 430). A round key of the second plurality of round keys is retained for use as a basis for a second derived key K2 (step 440). A second encrypted data block E2 is decrypted using the second plurality of round keys over a first plurality of rounds to generate a second decrypted data block B2 while simultaneously processing the second derived key K2 to generate a third plurality of round keys (step 450).

In more detailed aspects of the invention, a round key of the second plurality of round keys may be retained for use as a basis for a third derived key K3 (step 460). The first encrypted data block E1, the second encrypted data block B2, the first decrypted data block B1, and the second decrypted data block B2, each may comprise 128 bits, and the initial block key K0, the first derived block key K1, the second derived block key K2, the third derived block key K3, the round keys of the first plurality of round keys, and the round keys of the second plurality of round keys, each may comprise 192 bits. Alternatively, the first encrypted data block E1, the second encrypted data block E2, the first decrypted data block B1, and the second decrypted data block B1, each may comprise 128 bits, and the initial block key K0, the first derived block key K1, the second derived block key K2, the third derived block key K3, the round keys of the first plurality of round keys, and the round keys of the second plurality of round keys, each may comprise 256 bits.

With further reference to FIGS. 1 and 6, another aspect of the invention may reside in a station 102, comprising: means 610 for processing an initial block key K0 to generate a first plurality of round keys; means 610 for retaining a round key of the first plurality of round keys for use as a basis for a first derived key K1; means 610 for decrypting a first encrypted data block E1 using the first plurality of round keys over a first plurality of rounds to generate a first decrypted data block B1 while simultaneously processing the first derived key K1 to generate a second plurality of round keys; means 610 for retaining a round key of the second plurality of round keys for use as a basis for a second derived key K2; and means 610 for decrypting a second encrypted data block E2 using the second plurality of round keys over a first plurality of rounds to generate a second decrypted data block B2 while simultaneously processing the second derived key K2 to generate a third plurality of round keys.

Another aspect of the invention may reside in a station 102, comprising: a processor 610 configured to: process an initial block key K0 to generate a first plurality of round keys; retain a round key of the first plurality of round keys for use as a basis for a first derived key K1; decrypt a first encrypted data block E1 using the first plurality of round keys over a first plurality of rounds to generate a first decrypted data block B1 while simultaneously processing the first derived key K1 to generate a second plurality of round keys; retain a round key of the second plurality of round keys for use as a basis for a second derived key K2; and decrypt a second encrypted data block E2 using the second plurality of round keys over a first plurality of rounds to generate a second decrypted data block B2 while simultaneously processing the second derived key K2 to generate a third plurality of round keys.

Another aspect of the invention may reside in a computer program product, comprising: computer-readable medium 620, comprising: code for causing a computer 600 to process an initial block key K0 to generate a first plurality of round keys; code for causing a computer 600 to retain a round key of the first plurality of round keys for use as a basis for a first derived key K1; code for causing a computer 600 to decrypt a first encrypted data block E1 using the first plurality of round keys over a first plurality of rounds to generate a first decrypted data block B1 while simultaneously processing the first derived key K1 to generate a second plurality of round keys; code for causing a computer 600 to retain a round key of the second plurality of round keys for use as a basis for a second derived key K2; and code for causing a computer 600 to decrypt a second encrypted data block E2 using the second plurality of round keys over a first plurality of rounds to generate a second decrypted data block B2 while simultaneously processing the second derived key K2 to generate a third plurality of round keys.

The station 102 may be a remote station RS comprising a computer 600 that includes a processor 610, a storage medium 620 such as memory and/or a disk drive, a display 630, and an input such as a keypad 640, and a wireless connection 650.

With reference to FIG. 1, a wireless remote station (RS) 102 (e.g. a mobile station MS) may communicate with one or more base stations (BS) 104 of a wireless communication system 100. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both non-transitory computer-readable storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for encryption key update in a station, comprising:
    encrypting a first data block using a first plurality of round keys over a first plurality of rounds to generate a first encrypted data block, wherein the first plurality of round keys are generated based on an initial block key;
    retaining a round key of the first plurality of round keys for use as a basis for a first derived block key; and
    encrypting a second data block using a second plurality of round keys over a second plurality of rounds to generate a second encrypted data block, wherein the second plurality of round keys are generated based on the first derived block key.

2. The method of claim 1, wherein the first and second encrypted data blocks are generated using the Advanced Encryption Standard algorithm.

3. The method of claim 1, wherein the first derived block key is a last round key of the first plurality of round keys.

4. The method of claim 1, wherein the first derived block key is based on an additional round key generated by further processing a last round key of the first plurality of round keys by at least one additional round.

5. The method of claim 1, further comprising:
    retaining a round key of the second plurality of round keys for use as a basis for a second derived block key.

6. The method of claim 5, wherein the second derived block key is a last round key of the second plurality of round keys.

7. The method of claim 5, wherein the second derived block key is based on an additional round key generated by further processing a last round key of the second plurality of round keys by at least one additional round.

8. The method of claim 1, wherein:
    the first data block, the second data block, the first encrypted data block, and the second encrypted data block, each comprise 128 bits; and
    the initial block key, the first derived block key, and the round keys of the first plurality of round keys, each comprise 192 bits.

9. The method of claim 1, wherein:
    the first data block, the second data block, the first encrypted data block, and the second encrypted data block, each comprise 128 bits; and
    the initial block key, the first derived block key, and the round keys of the first plurality of round keys, each comprise 256 bits.

10. The method of claim 1, wherein the station is a hardware station, and the encrypting and retaining are performed by the hardware station.

11. A station, comprising:
    means for encrypting a first data block using a first plurality of round keys over a first plurality of rounds to generate a first encrypted data block, wherein the first plurality of round keys are generated based on an initial block key;
    means for retaining a round key of the first plurality of round keys for use as a basis for a first derived block key; and
    means for encrypting a second data block using a second plurality of round keys over a second plurality of rounds to generate a second encrypted data block, wherein the second plurality of round keys are generated based on the first derived block key.

12. The station of claim 11, wherein the first and second encrypted data blocks are generated using the Advanced Encryption Standard algorithm.

13. The station of claim 11, wherein the first derived block key is a last round key of the first plurality of round keys.

14. The station of claim 11, wherein the first derived block key is based on an additional round key generated by further processing a last round key of the first plurality of round keys by at least one additional round.

15. The station of claim 11, further comprising:
    means for retaining a round key of the second plurality of round keys for use as a basis for a second derived block key.

16. The station of claim 15, wherein the second derived block key is a last round key of the second plurality of round keys.

17. The station of claim 15, wherein the second derived block key is based on an additional round key generated by further processing a last round key of the second plurality of round keys by at least one additional round.

18. The station of claim 11, wherein:
    the first data block, the second data block, the first encrypted data block, and the second encrypted data block, each comprise 128 bits; and
    the initial block key, the first derived block key, and the round keys of the first plurality of round keys, each comprise 192 bits.

19. The station of claim 11, wherein:
    the first data block, the second data block, the first encrypted data block, and the second encrypted data block, each comprise 128 bits; and
    the initial block key, the first derived block key, and the round keys of the first plurality of round keys, each comprise 256 bits.

20. The station of claim 11, wherein the station is a hardware station.

21. A station, comprising:
    a processor configured to:
        encrypt a first data block using a first plurality of round keys over a first plurality of rounds to generate a first encrypted data block, wherein the first plurality of round keys are generated based on an initial block key;
        retain a round key of the first plurality of round keys for use as a basis for a first derived block key; and
        encrypt a second data block using a second plurality of round keys over a second plurality of rounds to generate a second encrypted data block, wherein the second plurality of round keys are generated based on the first derived block key.

22. The station of claim 21, wherein the first and second encrypted data blocks are generated using the Advanced Encryption Standard algorithm.

23. The station of claim 21, wherein the first derived block key is a last round key of the first plurality of round keys.

24. The station of claim 21, wherein the first derived block key is based on an additional round key generated by further processing a last round key of the first plurality of round keys by at least one additional round.

25. The station of claim 21, where the processor is further configured to:
retain a round key of the second plurality of round keys for use as a basis for a second derived block key.

26. The station of claim 25, wherein the second derived block key is a last round key of the second plurality of round keys.

27. The station of claim 25, wherein the second derived block key is based on an additional round key generated by further processing a last round key of the second plurality of round keys by at least one additional round.

28. The station of claim 21, wherein:
the first data block, the second data block, the first encrypted data block, and the second encrypted data block, each comprise 128 bits; and
the initial block key, the first derived block key, and the round keys of the first plurality of round keys, each comprise 192 bits.

29. The station of claim 21, wherein:
the first data block, the second data block, the first encrypted data block, and the second encrypted data block, each comprise 128 bits; and
the initial block key, the first derived block key, and the round keys of the first plurality of round keys, each comprise 256 bits.

30. The station of claim 21, wherein the station is a hardware station.

31. A non-transitory computer-readable medium, comprising:
code for causing a computer to encrypt a first data block using a first plurality of round keys over a first plurality of rounds to generate a first encrypted data block, wherein the first plurality of round keys are generated based on an initial block key;
code for causing a computer to retain a round key of the first plurality of round keys for use as a basis for a first derived block key; and
code for causing a computer to encrypt a second data block using a second plurality of round keys over a second plurality of rounds to generate a second encrypted data block, wherein the second plurality of round keys are generated based on the first derived block key.

32. The non-transitory computer-readable medium of claim 31, wherein the first and second encrypted data blocks are generated using the Advanced Encryption Standard algorithm.

33. The non-transitory computer-readable medium of claim 31, wherein the first derived block key is a last round key of the first plurality of round keys.

34. The non-transitory computer-readable medium of claim 31, wherein the first derived block key is based on an additional round key generated by further processing a last round key of the first plurality of round keys by at least one additional round.

35. The non-transitory computer-readable medium of claim 31, wherein the computer readable medium further comprises:
code for causing a computer to retain a round key of the second plurality of round keys for use as a basis for a second derived block key.

36. The non-transitory computer-readable medium of claim 35, wherein the second derived block key is a last round key of the second plurality of round keys.

37. The non-transitory computer-readable medium of claim 35, wherein the second derived block key is based on an additional round key generated by further processing a last round key of the second plurality of round keys by at least one additional round.

38. The non-transitory computer-readable medium of claim 31, wherein:
the first data block, the second data block, the first encrypted data block, and the second encrypted data block, each comprise 128 bits; and
the initial block key, the first derived block key, and the round keys of the first plurality of round keys, each comprise 192 bits.

39. The non-transitory computer-readable medium of claim 31, wherein:
the first data block, the second data block, the first encrypted data block, and the second encrypted data block, each comprise 128 bits; and
the initial block key, the first derived block key, and the round keys of the first plurality of round keys, each comprise 256 bits.

40. A method for key update in a station, comprising:
processing an initial block key to generate a first plurality of round keys;
retaining a round key of the first plurality of round keys for use as a basis for a first derived key;
decrypting a first encrypted data block using the first plurality of round keys over a first plurality of rounds to generate a first decrypted data block while processing the first derived key to generate a second plurality of round keys;
retaining a round key of the second plurality of round keys for use as a basis for a second derived key; and
decrypting a second encrypted data block using the second plurality of round keys over a second plurality of rounds to generate a second decrypted data block while processing the second derived key to generate a third plurality of round keys.

41. The method of claim 40, further comprising:
retaining a round key of the second plurality of round keys for use as a basis for a third derived key.

42. The method of claim 40, wherein the first and second decrypted data blocks are generated using the Advanced Encryption Standard algorithm.

43. The method of claim 40, wherein the first derived block key is a last round key of the first plurality of round keys.

44. The method of claim 43, wherein the second derived block key is a last round key of the second plurality of round keys.

45. The method of claim 40, wherein the first derived block key is based on an additional round key generated by further processing a last round key of the first plurality of round keys by at least one additional round.

46. The method of claim 45, wherein the second derived block key is based on an additional round key generated by further processing a last round key of the second plurality of round keys by at least one additional round.

47. The method of claim 40, wherein:
the first encrypted data block, the second encrypted data block, the first decrypted data block, and the second decrypted data block, each comprise 128 bits; and
the initial block key, the first derived block key, the second derived block key, the round keys of the first plurality of round keys, and the round keys of the second plurality of round keys, each comprise 192 bits.

48. The method of claim 40, wherein:
the first encrypted data block, the second encrypted data block, the first decrypted data block, and the second decrypted data block, each comprise 128 bits; and
the initial block key, the first derived block key, the second derived block key, the round keys of the first plurality of round keys, and the round keys of the second plurality of round keys, each comprise 256 bits.

49. The method of claim 40, wherein the station is a hardware station, and the decrypting and retaining are performed by the hardware station.

50. A station, comprising:
means for processing an initial block key to generate a first plurality of round keys;
means for retaining a round key of the first plurality of round keys for use as a basis for a first derived key;
means for decrypting a first encrypted data block using the first plurality of round keys over a first plurality of rounds to generate a first decrypted data block while processing the first derived key to generate a second plurality of round keys;
means for retaining a round key of the second plurality of round keys for use as a basis for a second derived key; and
means for decrypting a second encrypted data block using the second plurality of round keys over a second plurality of rounds to generate a second decrypted data block while processing the second derived key to generate a third plurality of round keys.

51. The station of claim 50, further comprising:
means for retaining a round key of the second plurality of round keys for use as a basis for a third derived key.

52. The station of claim 50, wherein the first and second decrypted data blocks are generated using the Advanced Encryption Standard algorithm.

53. The station of claim 50, wherein the first derived block key is a last round key of the first plurality of round keys.

54. The station of claim 53, wherein the second derived block key is a last round key of the second plurality of round keys.

55. The station of claim 50, wherein the first derived block key is based on an additional round key generated by further processing a last round key of the first plurality of round keys by at least one additional round.

56. The station of claim 55, wherein the second derived block key is based on an additional round key generated by further processing a last round key of the second plurality of round keys by at least one additional round.

57. The station of claim 50, wherein:
the first encrypted data block, the second encrypted data block, the first decrypted data block, and the second decrypted data block, each comprise 128 bits; and
the initial block key, the first derived block key, the second derived block key, the round keys of the first plurality of round keys, and the round keys of the second plurality of round keys, each comprise 192 bits.

58. The station of claim 50, wherein:
the first encrypted data block, the second encrypted data block, the first decrypted data block, and the second decrypted data block, each comprise 128 bits; and
the initial block key, the first derived block key, the second derived block key, the round keys of the first plurality of round keys, and the round keys of the second plurality of round keys, each comprise 256 bits.

59. The station of claim 50, wherein the station is a hardware station, and the decrypting and retaining are performed by the hardware station.

60. A station, comprising:
a processor configured to:
process an initial block key to generate a first plurality of round keys;
retain a round key of the first plurality of round keys for use as a basis for a first derived key;
decrypt a first encrypted data block using the first plurality of round keys over a first plurality of rounds to generate a first decrypted data block while processing the first derived key to generate a second plurality of round keys;
retain a round key of the second plurality of round keys for use as a basis for a second derived key; and
decrypt a second encrypted data block using the second plurality of round keys over a second plurality of rounds to generate a second decrypted data block while processing the second derived key to generate a third plurality of round keys.

61. The station of claim 60, wherein the processor is further configured to:
retain a round key of the second plurality of round keys for use as a basis for a third derived key.

62. The station of claim 60, wherein the first and second decrypted data blocks are generated using the Advanced Encryption Standard algorithm.

63. The station of claim 60, wherein the first derived block key is a last round key of the first plurality of round keys.

64. The station of claim 63, wherein the second derived block key is a last round key of the second plurality of round keys.

65. The station as defined in claim 60, wherein the first derived block key is based on an additional round key generated by further processing a last round key of the first plurality of round keys by at least one additional round.

66. The station of claim 65, wherein the second derived block key is based on an additional round key generated by further processing a last round key of the second plurality of round keys by at least one additional round.

67. The station of claim 60, wherein:
the first encrypted data block, the second encrypted data block, the first decrypted data block, and the second decrypted data block, each comprise 128 bits; and
the initial block key, the first derived block key, the second derived block key, the round keys of the first plurality of round keys, and the round keys of the second plurality of round keys, each comprise 192 bits.

68. The station of claim 60, wherein:
the first encrypted data block, the second encrypted data block, the first decrypted data block, and the second decrypted data block, each comprise 128 bits; and
the initial block key, the first derived block key, the second derived block key, the round keys of the first plurality of round keys, and the round keys of the second plurality of round keys, each comprise 256 bits.

69. The station of claim 60, wherein the station is a hardware station, and the decrypting and retaining are performed by the hardware station.

70. A non-transitory computer-readable medium, comprising:
- code for causing a computer to process an initial block key to generate a first plurality of round keys;
- code for causing a computer to retain a round key of the first plurality of round keys for use as a basis for a first derived key;
- code for causing a computer to decrypt a first encrypted data block using the first plurality of round keys over a first plurality of rounds to generate a first decrypted data block while processing the first derived key to generate a second plurality of round keys;
- code for causing a computer to retain a round key of the second plurality of round keys for use as a basis for a second derived key; and
- code for causing a computer to decrypt a second encrypted data block using the second plurality of round keys over a second plurality of rounds to generate a second decrypted data block while processing the second derived key to generate a third plurality of round keys.

71. The non-transitory computer-readable medium of claim 70, wherein the computer-readable medium further comprises:
- code for causing a computer to retain a round key of the second plurality of round keys for use as a basis for a third derived key.

72. The non-transitory computer-readable medium of claim 70, wherein the first and second encrypted data blocks are generated using the Advanced Encryption Standard algorithm.

73. The non-transitory computer-readable medium of claim 70, wherein the first derived block key is a last round key of the first plurality of round keys.

74. The non-transitory computer-readable medium of claim 73, wherein the wherein the second derived block key is a last round key of the second plurality of round keys.

75. The non-transitory computer-readable medium of claim 70, wherein the first derived block key is based on an additional round key generated by further processing a last round key of the first plurality of round keys by at least one additional round.

76. The non-transitory computer-readable medium of claim 75, wherein the second derived block key is based on an additional round key generated by further processing a last round key of the second plurality of round keys by at least one additional round.

77. The non-transitory computer-readable medium of claim 70, wherein:
- the first encrypted data block, the second encrypted data block, the first decrypted data block, and the second decrypted data block, each comprise 128 bits; and
- the initial block key, the first derived block key, the second derived block key, the round keys of the first plurality of round keys, and the round keys of the second plurality of round keys, each comprise 192 bits.

78. The non-transitory computer-readable medium of claim 70, wherein:
- the first encrypted data block, the second encrypted data block, the first decrypted data block, and the second decrypted data block, each comprise 128 bits; and
- the initial block key, the first derived block key, the second derived block key, the round keys of the first plurality of round keys, and the round keys of the second plurality of round keys, each comprise 256 bits.

* * * * *